UNITED STATES PATENT OFFICE.

B. O'REILLY, OF NEW YORK, N. Y.

IMPROVED COMPOSITION FOR KINDLING FIRES.

Specification forming part of Letters Patent No. 13,758, dated November 6, 1855.

*To all whom it may concern:*

Be it known that I, BERNARD O'REILLY, of the city, county, and State of New York, have invented a new and useful compound of inflammable materials, for the purpose of igniting fires in grates, stoves, furnaces, or other fire-places; and I do hereby declare that the following is a full, clear, and exact description of the same.

The object of this invention is to produce a compound possessing the properties of igniting quickly, of burning with a large flame and with an intense heat, and of burning for a long time, and that shall at the same time be cleanly, not bulky, and free from any unpleasant odor.

To produce the compound I take of white turpentine, gum-olibanum, gum-camphor, and powdered charcoal or other solid carbonaceous matter in the following proportions, by weight: white turpentine, sixteen parts; gum-olibanum, one part; gum-camphor, one part; powdered charcoal, eight parts.

In a suitable vessel, heated to a suitable degree to melt the white turpentine by any convenient means, but preferably by a steam-pipe or steam-jacket, I first place the white turpentine, which is allowed to melt before the addition of any of the other ingredients. I then add the gum-olibanum and gum-camphor, which have been previously reduced as nearly as possible to a state of powder. After the gum-olibanum and gum-camphor have been dissolved in the turpentine I add the powdered charcoal and stir the whole together till they are thoroughly mixed. The compound at this stage of the process of manufacture is a pasty mass, and in this state I mold it into pastiles, cakes, or any convenient form for use. When it cools it becomes hard and solid.

The duty of the several ingredients of the composition is as follows: The gum-camphor ignites very readily when a lighted match is applied and burns with a brilliant flame. The gum-olibanum next ignites and burns with great heat, which ignites the turpentine. The charcoal keeps the several parts of the compound together and prevents them flowing away when softened by heat. It also serves as a heat-reserving medium to keep the other ingredients at such a heat as to produce very perfect combustion. It at the same time prevents too rapid burning of the other parts, by reason of its holding them, as it were, in a number of minute cells or interstices between its particles.

The proportions which I have given for the several ingredients forming the compound are those which after careful experiment I have been led to adopt as giving the best results; but these proportions may be varied to a considerable extent without materially deteriorating the compound.

This compound is very economical, owing to the extremely small quantity which is requisite to be used for lighting a fire. I consider less than one-quarter of an ounce to be sufficient with a small quantity of charcoal to light an anthracite-coal fire in a grate or stove.

What I claim as my invention, and desire to secure by Letters Patent, is—

The fire-lighting compound formed by the admixture of the several ingredients herein specified, in the manner and in about the proportions herein set forth.

BERNARD O'REILLY.

Witnesses:
JOS. GEO. MASON,
WM. TUSCH.